United States Patent
Moschet et al.

(10) Patent No.: US 10,224,584 B2
(45) Date of Patent: Mar. 5, 2019

(54) BATTERY PACK HEAT EXCHANGER

(71) Applicant: FORD GLOBAL TECHNOLOGIES, LLC, Dearborn, MI (US)

(72) Inventors: Dave Moschet, Dearborn, MI (US); Rajaram Subramanian, Ann Arbor, MI (US); Sai K. Perumalla, Rochester Hills, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 416 days.

(21) Appl. No.: 14/804,703

(22) Filed: Jul. 21, 2015

(65) Prior Publication Data

US 2017/0025721 A1 Jan. 26, 2017

(51) Int. Cl.
| | | |
|---|---|---|
| *F28F 7/00* | (2006.01) | |
| *H01M 10/625* | (2014.01) | |
| *H01M 10/6556* | (2014.01) | |
| *H01M 10/6568* | (2014.01) | |
| *H01M 2/10* | (2006.01) | |

(52) U.S. Cl.
CPC ..... *H01M 10/625* (2015.04); *H01M 10/6556* (2015.04); *H01M 10/6568* (2015.04); *H01M 2/1077* (2013.01); *H01M 2220/20* (2013.01)

(58) Field of Classification Search
CPC .............. H01M 10/625; H01M 10/65; H01M 2220/20; F25D 3/02; F25D 17/02; H05K 7/20272; B60K 11/06; H01L 23/473
USPC ....................................................... 165/80.2
See application file for complete search history.

(56) References Cited

U.S. PATENT DOCUMENTS

| | | | |
|---|---|---|---|
| 6,396,694 B1 * | 5/2002 | van den Berg | H05K 3/284 257/787 |
| 8,342,279 B1 | 1/2013 | Florus et al. | |
| 2011/0317369 A1 * | 12/2011 | Pautsch | H01L 23/473 361/702 |
| 2012/0315528 A1 | 12/2012 | Rajaie et al. | |
| 2013/0192807 A1 | 8/2013 | DeKeuster | |
| 2014/0202178 A1 | 7/2014 | Trumbower | |
| 2015/0144314 A1 | 5/2015 | Srinivassan et al. | |
| 2015/0291019 A1 * | 10/2015 | Hatta | B60K 11/06 180/68.2 |
| 2016/0029515 A1 * | 1/2016 | Tansley | F25D 3/02 165/104.33 |

OTHER PUBLICATIONS

Wakefield-Vette, Liquid Cold Plates, retrieved from http://www.wakefield-vette.com/products/liquid-cooling/liquid-cold-plates.aspx (c) 2015.

* cited by examiner

*Primary Examiner* — David D Hwu
(74) *Attorney, Agent, or Firm* — Carlson, Gaskey & Olds, P.C.

(57) ABSTRACT

An exemplary battery pack heat exchanger includes a wall of an enclosure, and a heat exchanger lid held against the wall to provide a chamber that receives a fluid to exchange thermal energy with a battery array that is outside of the chamber. An exemplary method of managing battery pack thermal energy includes moving a fluid through a chamber within an enclosure wall of a battery pack to adjust thermal energy levels of the battery pack.

11 Claims, 8 Drawing Sheets

BATTERY PACK HEAT EXCHANGER

TECHNICAL FIELD

This disclosure relates to a heat exchanger for a battery pack. More particularly, this disclosure relates to a heat exchanger integrated into a portion of a battery pack enclosure. The heat exchanger can include a plurality of fluid ports, which increases design flexibility.

BACKGROUND

Electrified vehicles generally differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Traction batteries typically include at least one group of battery cells disposed on a cold plate. An enclosure holds the battery cells and plate within an open area. The enclosure is separate from the plate. Fluid communicates to the plate through inlet and outlet conduits that extend through the enclosure. The plate and fluid manage thermal energy in the battery pack, which can improve efficiencies and inhibit undesirable thermal energy buildup.

SUMMARY

A battery pack heat exchanger according to an exemplary aspect of the present disclosure includes, among other things, a wall of an enclosure, and a heat exchanger lid held against the wall to provide a chamber that receives a fluid to exchange thermal energy with a battery array that is outside of the chamber.

In a further non-limiting embodiment of the foregoing battery pack heat exchanger, the enclosure provides an open area that receives the battery array.

In a further non-limiting embodiment of any of the foregoing battery pack heat exchangers, the battery array is supported upon a supporting surface of the wall and the heat exchanger lid is secured an outer surface of the wall, the outer surface opposite the supporting surface.

In a further non-limiting embodiment of any of the foregoing battery pack heat exchangers, the battery pack heat exchanger includes a cover, and the wall of the enclosure is a tray secured to the cover to provide the open area.

In a further non-limiting embodiment of any of the foregoing battery pack heat exchangers, the battery pack heat exchanger includes a plurality of fluid ports within the heat exchanger lid or the wall. The fluid ports provide more than one connection point that connects a fluid inlet conduit to the chamber, more than one connection point that connects a fluid outlet conduit to the chamber, or more than one connection point that connects either the fluid outlet conduit or the fluid inlet conduit to the chamber.

In a further non-limiting embodiment of any of the foregoing battery pack heat exchangers, at least one of the fluid ports is within a first end region of the heat exchanger lid, and at least one of the fluid ports is within a second end region of the heat exchanger lid. The first end region is opposite the second end region.

In a further non-limiting embodiment of any of the foregoing battery pack heat exchangers, at least one of the fluid ports is within a first end region of the wall, and at least one of the fluid ports is within a second end region of the wall. The first end region is opposite the second end region.

In a further non-limiting embodiment of any of the foregoing battery pack heat exchangers, the battery pack heat exchanger includes a divider separating the chamber into at least a first region and a separate section.

In a further non-limiting embodiment of any of the foregoing battery pack heat exchangers, the first region is configured to communicate a flow of fluid through the chamber in a first direction, and the second region is configured to communicate a flow of fluid through the chamber in a second direction opposite the first direction.

In a further non-limiting embodiment of any of the foregoing battery pack heat exchangers, the battery pack heat exchangers include an opening permitting the flow of fluid in the first region of the chamber to move to the second region of the chamber.

In a further non-limiting embodiment of any of the foregoing battery pack heat exchangers, the heat exchanger lid is securable to the wall in a first position and alternatively securable to the wall in a second position. The opening is closer to a first axial end of the wall when the heat exchanger lid is in the first position than when the heat exchanger lid is in the second position.

A method of managing battery pack thermal energy according to another exemplary aspect of the present disclosure includes, among other things, moving a fluid through a chamber at least partially provided by a wall of a battery pack. The moving is to adjust thermal energy levels of the battery pack.

In a further non-limiting embodiment of the foregoing method, the fluid absorbs thermal energy from the battery pack.

In a further non-limiting embodiment of any of the foregoing methods, the wall is a wall of a battery pack enclosure.

In a further non-limiting embodiment of any of the foregoing methods, an enclosure tray provides the wall.

In a further non-limiting embodiment of any of the foregoing methods, the method includes securing a heat exchanger lid to the wall to provide the chamber.

In a further non-limiting embodiment of any of the foregoing methods, the heat exchanger lid is securable to the wall in a first position and a second position that is different than the first position.

In a further non-limiting embodiment of any of the foregoing methods, the lid in the first position is rotated 180° relative to the lid in the second position.

In a further non-limiting embodiment of any of the foregoing methods, the wall and the heat exchanger lid provide a plurality of fluid ports that provide more than one connection point to connect a fluid inlet conduit to the chamber, more than one connection point to connect a fluid outlet conduit to the chamber, or more than one connection point to connect either the fluid outlet conduit or the fluid inlet conduit to the chamber.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a heat exchanger for a battery pack. More particularly, this disclosure relates to a heat exchanger integrated into a portion of a battery pack enclosure. The heat exchanger provides a plurality of options for positioning an inlet conduit and a plurality of options for positioning an outlet conduit.

Figure 1:
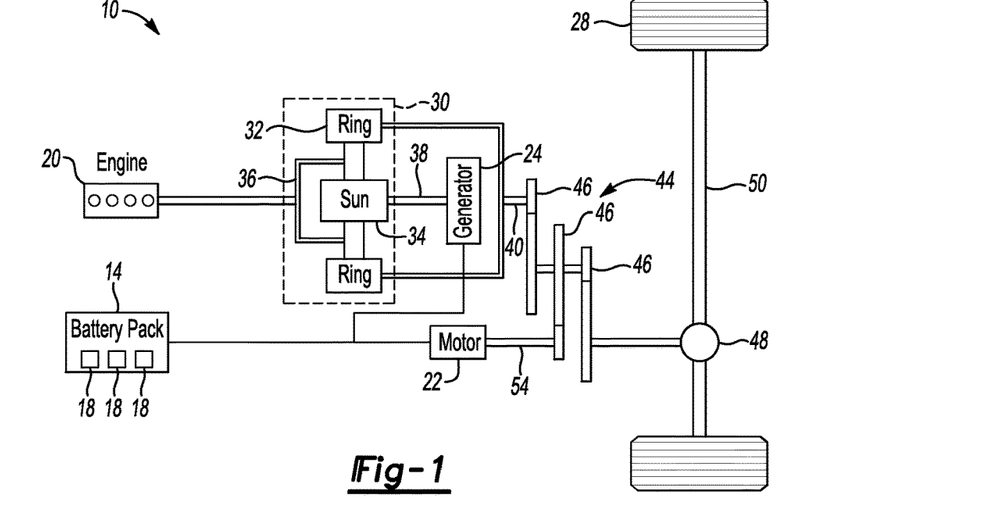
FIG. 1 illustrates a highly schematic view of a powertrain for an example electrified vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
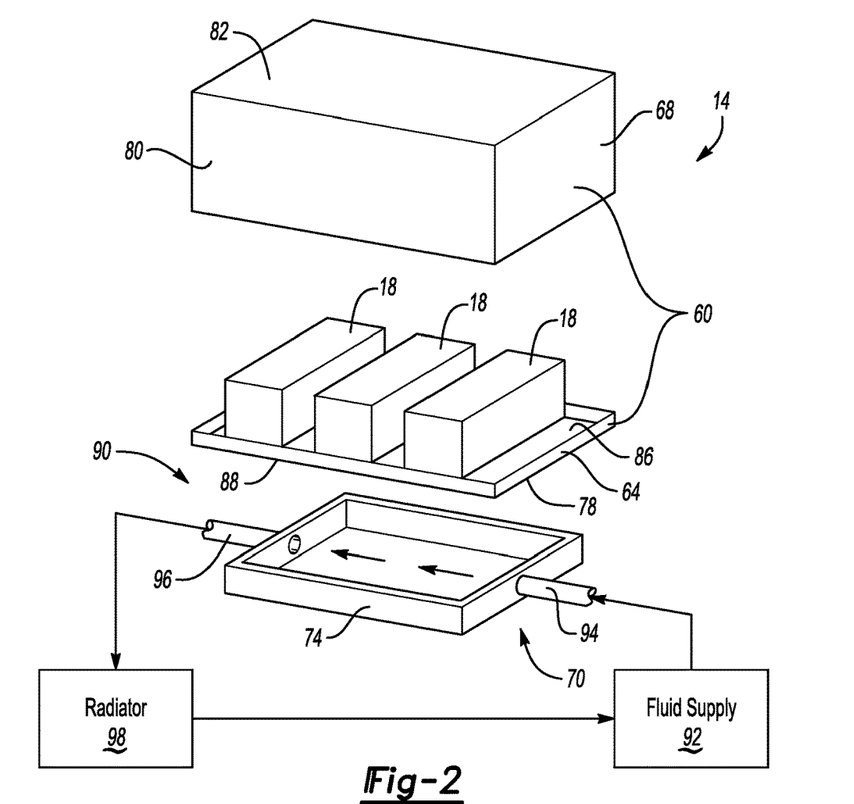
FIG. 2 illustrates an exploded view of a battery pack from the powertrain of FIG. 1 and a partially schematic representation of a flow of a heat exchanger fluid to and from the battery pack.

Referring now to FIG. 2 with continuing reference to FIG. 1, an enclosure 60 includes, in this example, a tray 64 and a cover 68 that are joined to provide an open area to hold the arrays 18 of the battery pack 14.

The battery pack 14 includes a battery pack heat exchanger 70. The battery pack heat exchanger 70 includes a heat exchanger lid 74 secured to a wall 78 provided by the tray 64 of the enclosure 60.

During operation, the arrays 18, and potentially other portions of the battery pack 14, generate thermal energy. A fluid can move through the battery pack heat exchanger 70 to remove thermal energy from the battery pack 14. The fluid is a coolant, for example.

The battery pack heat exchanger 70 can also, in some examples, heat the battery pack 14 using the fluid. Heating the battery pack 14 can be required during a cold start, for example.

In this example, the lid 74 is held against the wall 78 to provide the battery pack heat exchanger 70. The wall 78 is a floor or downwardly facing side of the tray 64.

In another example, the lid 74 is secured to a sidewall 80, an upper wall 82, or some combination of the wall 78, sidewalls 80, and upper wall 82.

The arrays 18 are disposed upon a supporting surface 86 of the wall 78. The lid 74 secures to a surface 88 of the wall 78 that faces away from the surface 86.

The lid 74 secures to the surface 88 of the wall 78 to provide a chamber 90. Fluid moves from a fluid supply 92 to an inlet 94 and into the chamber 90. If the fluid is used to cool the battery pack 14, the fluid within the chamber 90 receives thermal energy. The fluid, which has been heated, moves through an outlet 96 to a radiator 98. Thermal energy communicates away from the fluid at the radiator 98. Once cooled, the fluid returns to the fluid supply 92 from the radiator 98.

Fluid within the chamber 90 can be used to cool (or heat) the battery pack 14. Thus, a separate heat exchanger plate is not required within the battery pack 14 as is required in some prior art designs.

Referring now to FIGS. 3 to 10 with continuing reference to FIG. 2, an example embodiment of a battery pack heat exchanger 170 includes a heat exchanger lid 174 and a wall 178. The heat exchanger 170 can be used within the battery pack 14. A battery pack enclosure provides the wall 178. Specifically, the wall 178 is a wall of a tray 164 that provides a vertical bottom or downwardly-facing side of the battery pack enclosure.

Portions of the lid 174 and the wall 178 are spaced such that holding the lid 174 against the wall 178 provides a chamber 190. The arrays 18 of the battery pack 14 can be placed on upon the wall 178 near the chamber 190. Fluid moves through the chamber 190 to manage thermal energy levels of the arrays 18 and other areas of the battery pack 14. The example wall 178 is not entirely planar and can include protrusions or extensions.

In this example, the wall 178 includes a divider 102 and the lid 174 provides a groove 104. The divider 102 is partially received within the groove 104 when the lid 174 is held against the wall 178 as shown in FIGS. 5 and 6.

In another example, the lid 174 provides the divider 102, or some portion of the divider 102, and the wall 178 provides the groove 104, or some portion of the groove 104.

Figure 3:
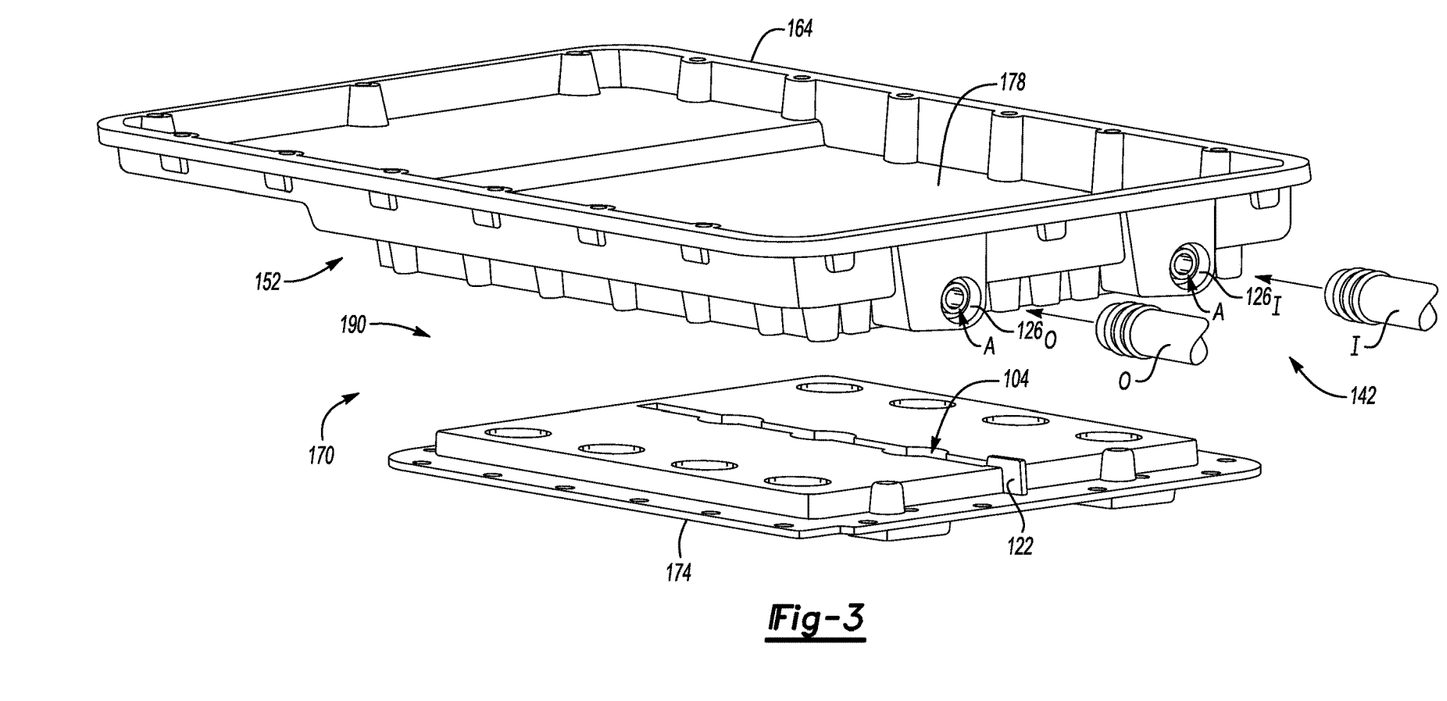
FIG. 3 illustrates an exploded perspective view of a battery pack heat exchanger for use with the battery pack of FIG. 2.
Figure 4:
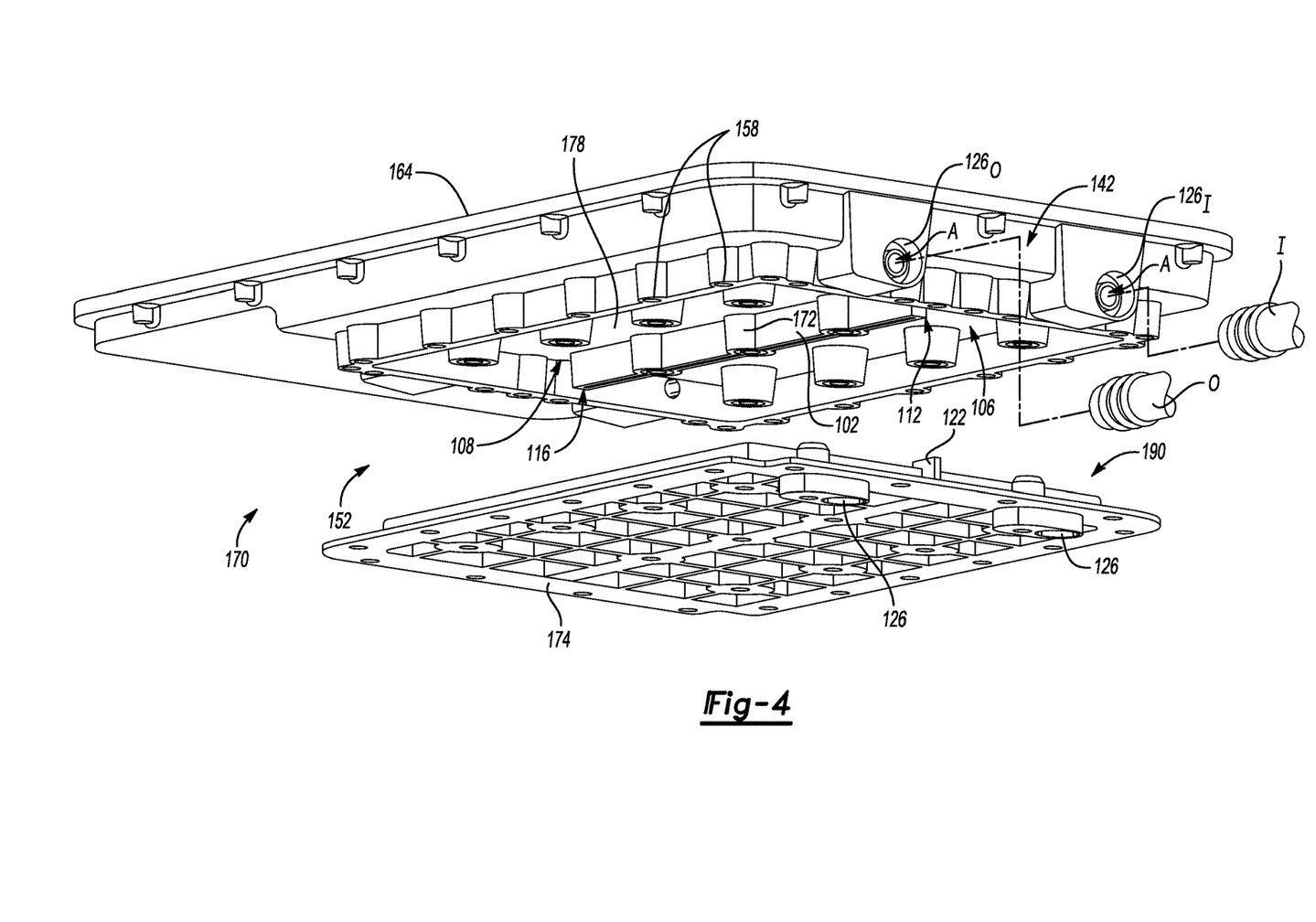
FIG. 4 illustrates another exploded perspective view of the battery pack heat exchanger of FIG. 3.

The divider 102 separates the chamber 190 into a first region 106 and a second region 108. Fluid moving within the chamber 190 can move from the first region 106 to the second region 108, and from the second region 108 to the first region 106, through a first opening 112 or a second opening 116.

Figure 5:
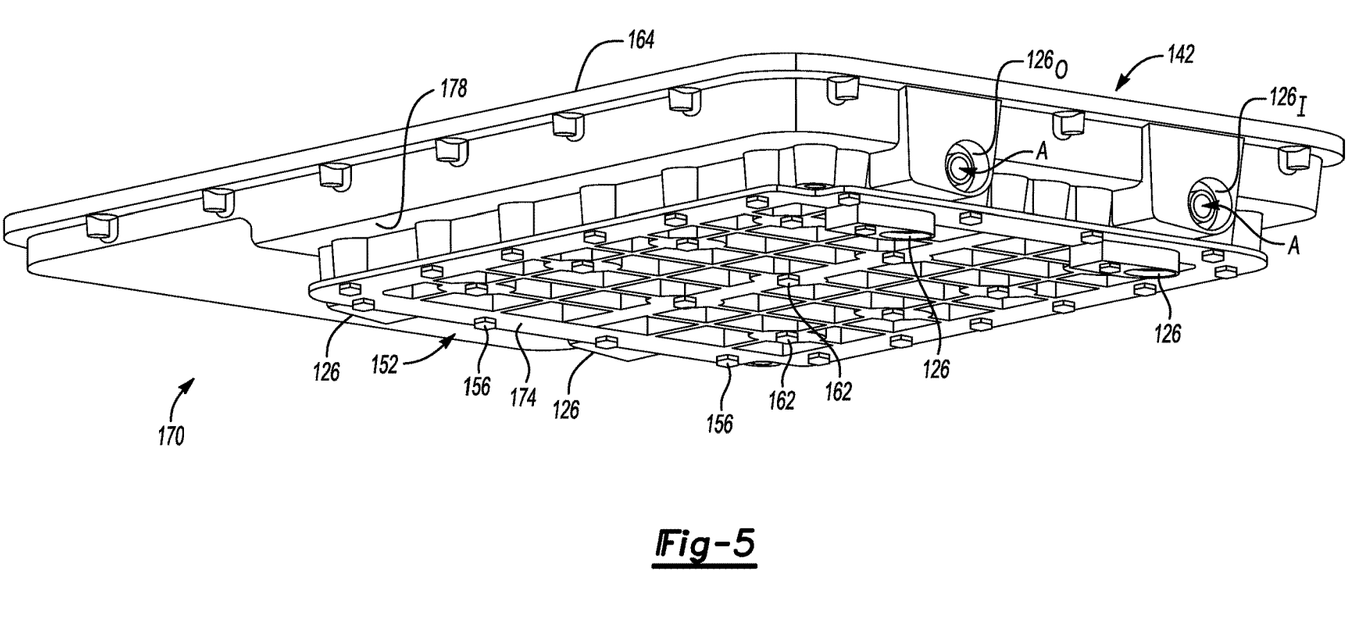
FIG. 5 illustrates a perspective view of a first end of the battery pack heat exchanger of FIG. 3 with a heat exchanger lid held against a wall in a first position.
Figure 6:
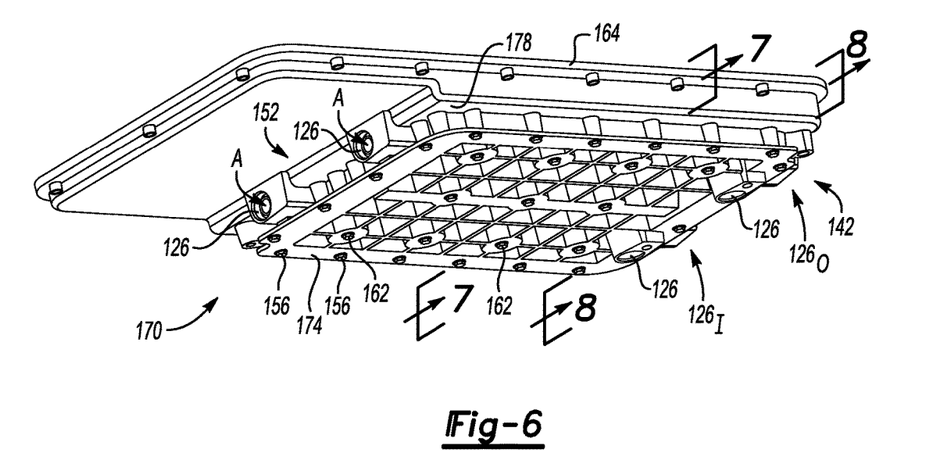
FIG. 6 illustrates a perspective view of an opposing, second end of the battery pack heat exchanger of FIG. 3 with the heat exchanger lid held against the wall in the first position.
Figure 7:
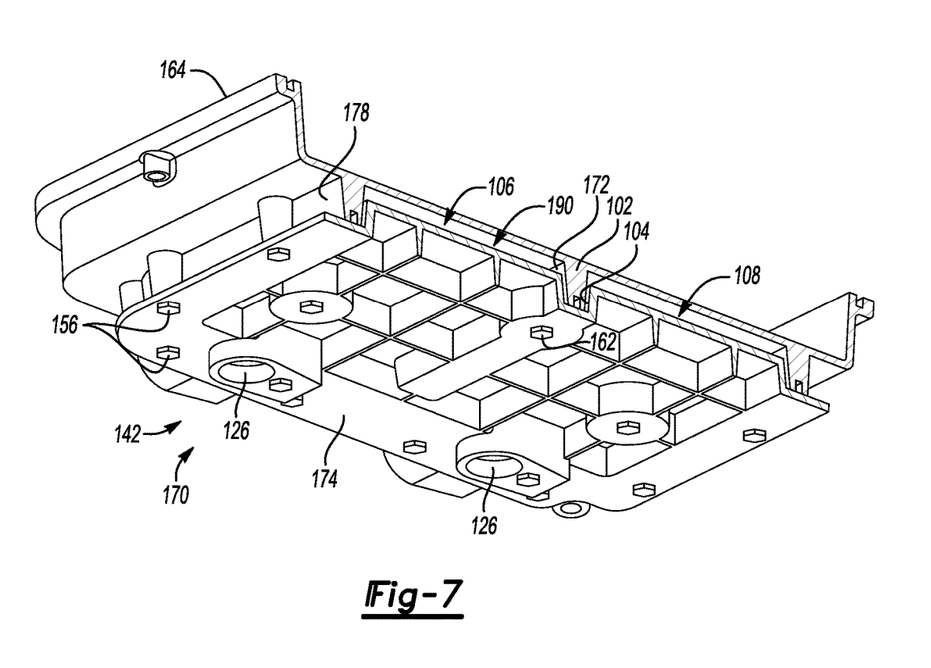
FIG. 7 illustrates a section view at line 7-7 in FIG. 6.
Figure 8:
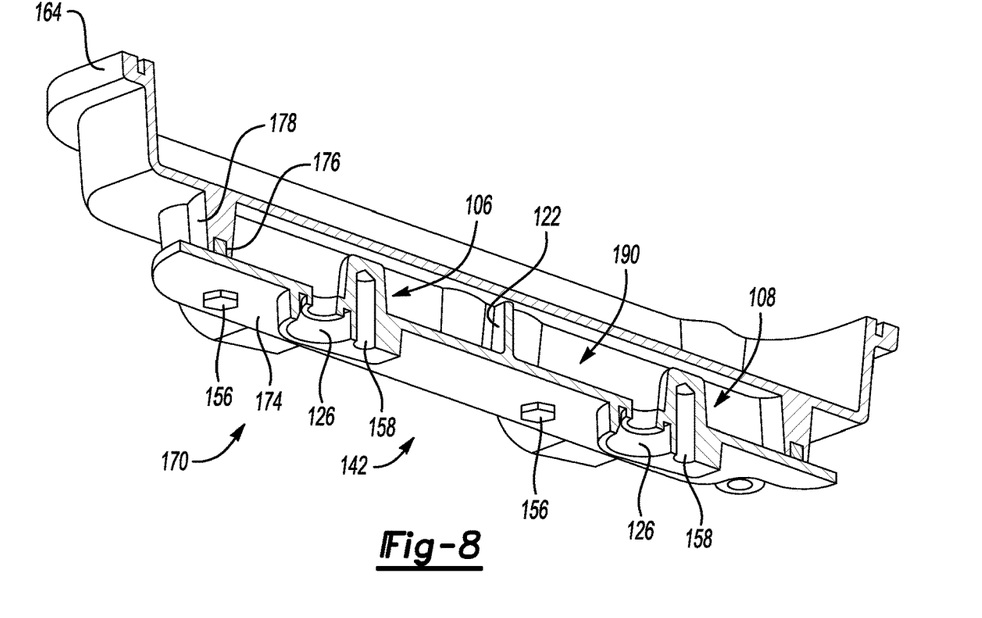
FIG. 8 illustrates a section view at line 8-8 in FIG. 6.

In this example, the lid 174 includes a blocker flange 122 that blocks some or all of the fluid movement through the first opening 112 when the lid 174 is in the position of FIGS. 5 and 6.

The lid 174 and the wall 178 include a plurality of fluid ports 126. Each of the fluid ports 126 provides a connection point to connect the chamber 190 to an inlet conduit I or an outlet conduit O (see FIGS. 3 and 4). For example, the inlet conduit I can be press fit into one of the fluid ports 126, and the outlet conduit O can be press fit into another of the fluid ports 126.

The example lid 74 includes four of the fluid ports 126. Other numbers of fluid ports 126 could be included if desired.

Two of the fluid ports 126 are located at a first end 142 of the chamber 190. Two of the fluid ports 126 within the tray 164 are located at a second end 152 of the chamber 190. The example tray 164 thus provides four possible locations for connecting the inlet conduit I to the chamber 190 and four possible locations for connecting the outlet conduit O to the chamber 190. Of course, in this example, if the inlet conduit I is connected to one of the fluid ports 126, that fluid port 126 is not an option for connecting the outlet conduit O, and vice versa.

The tray 164 is cast of a metallic material, such as an aluminum. In other examples, the tray 164 is manufactured by a process other than casting, such as an injection molding process.

Figure 9:
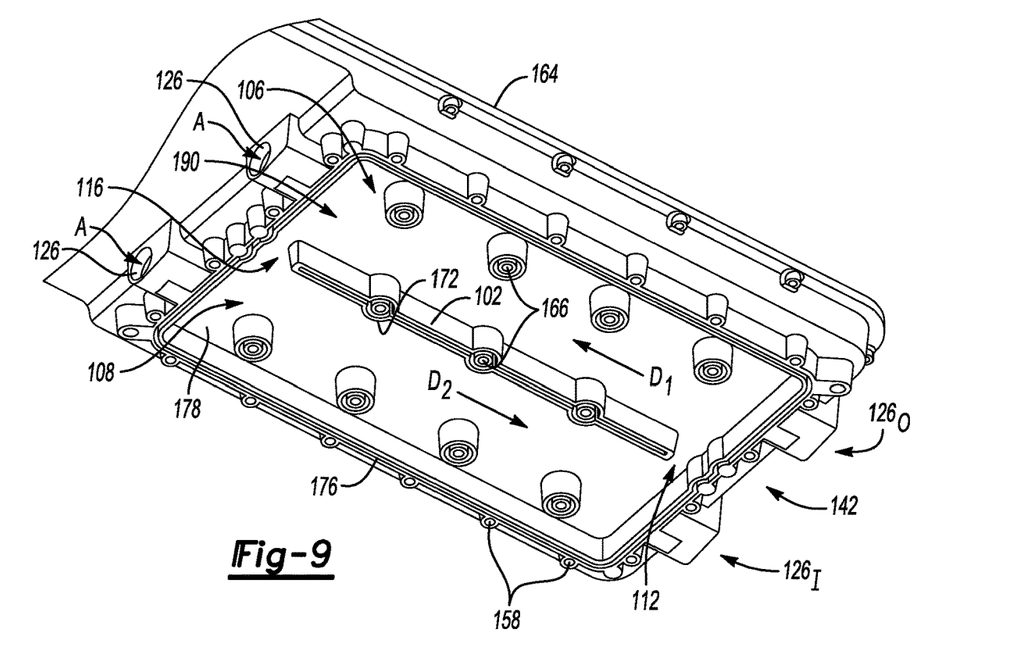
FIG. 9 illustrates a perspective view of a tray from the battery pack heat exchanger of FIG. 3.

The tray 164 is cast to include material that blocks movement of fluid to and from the chamber 190 through the fluid ports 126 after casting. For example, immediately after casting the tray 164 material would extend across apertures A.

If one of the fluid ports 126 is to be used as an inlet to the chamber 190, a secondary operation, such as a drilling operation, is used to remove material within the aperture A that blocks movement of fluid through that fluid port 126 to the chamber 190. The secondary operation provide passages for the fluid to move from the inlet conduit through the selected fluid port 126 into the chamber 190.

In other example, the tray 164 is cast with an insert that blocks material from extending within the fluid ports 126 desired for the inlet or outlet.

Similarly, if one of the fluid ports 126 is to be used as an outlet from the chamber 190, a secondary operation, such as a drilling operation, is used to remove material within the aperture A that blocks movement of fluid from the chamber 190 through that fluid port 126.

If one of the fluid ports 126 in the tray 164 is used as an inlet, and one of the fluid ports 126 in the tray 164 is used as the outlet, material is not removed from the apertures associated with the remaining fluid ports 126. This material blocks fluid movement through the remaining two fluid ports 126 in the tray 164. Fluid thus does not move from the chamber 190 through the remaining fluid ports 126. These remaining two fluid ports are, however, still cast into the tray 164 and, in this example, could connect to an inlet conduit or outlet conduit even with the material in the aperture. Thus, after casting, a designer can select desired fluid ports 126 for the inlet and outlet, and then remove material from the apertures A associated with those fluid ports 126.

Figure 10:
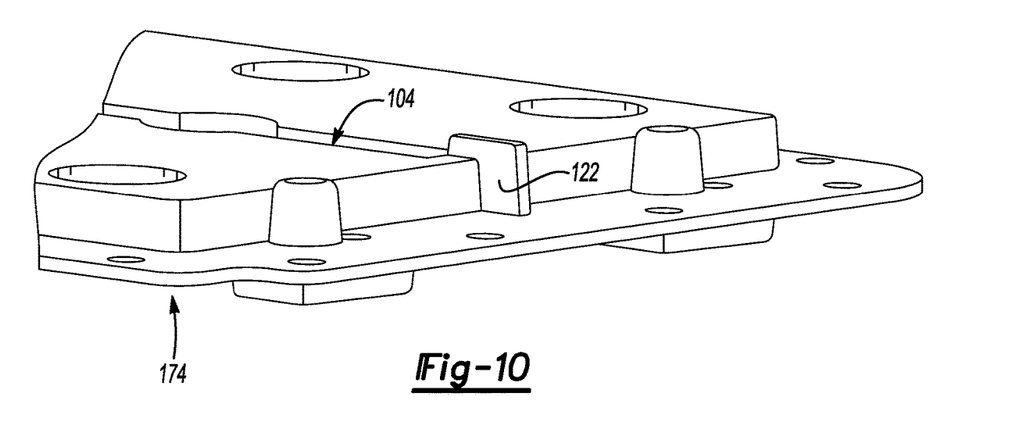
FIG. 10 illustrates a perspective view of an end of the heat exchanger lid from the battery pack heat exchanger of FIG. 3.

The example lid 174 includes two fluid ports 126. Other numbers of fluid ports 126 could be included if desired. The fluid ports 126 in the lid 174 can be used as an inlet to the chamber 190 or an outlet to the chamber 190 instead of the fluid ports 126 in the tray 164. The inlet conduit I and outlet conduit O are selectively connectable to the fluid ports 126 in the lid 174

The lid 174 is a cast part. In other examples, the lid 174 is manufactured by a process other than casting, such as an injection molding process. The lid 174 is cast to include material that blocks movement of fluid to and from the chamber 190 through the fluid ports 126 after casting. For example, immediately after casting the tray 164 material would extend across apertures associated with the two fluid ports 126 in the lid 174.

If an inlet to the chamber 190 is desired through one of the fluid ports 126 of the lid 174, a secondary operation is performed on that fluid port 126 within the lid 174 to remove material blocking fluid from moving through an inlet conduit through that fluid port 126 into the chamber 190.

Similarly, if one of the fluid ports 126 in the lid 174 is desired for use as an outlet from the chamber 190, a secondary operation can be used to remove material that would block flow from the chamber 190 through that fluid port 126.

In other example, the lid 174 is cast with an insert that blocks material from extending within the fluid ports 126 desired for the inlet or outlet.

The two fluid ports 126 in the lid 174 provide locations to attach an inlet conduit or an outlet conduit such that the conduit extends vertically downward from the chamber 190. The four fluid ports 126 within the tray 164 provide locations to attach an inlet conduit or and outlet conduit such that the conduit extend laterally from the chamber 190, or in some other direction.

In other examples, fluid ports in the lid 174 can provide locations to attach an inlet conduit or and outlet conduit such that the conduits extend laterally from the chamber 190. In other examples, fluid ports in the tray 164 can provide locations to attach an inlet conduit or and outlet conduit such that the conduits extend laterally from the chamber 190, or in some other direction.

In one specific embodiment, a fluid port $126_I$ is used as an inlet to the chamber 190 and a fluid port $126_O$ is used as an outlet from the chamber 190. Material the remains in the apertures associated with the remaining fluid ports 126 in the lid 174 and the tray 164.

Fluid moves through the fluid port $126_I$ into the first region 106 of the chamber 190. The divider 102 and the blocker flange 122 force the flow of fluid entering the chamber 190 through the fluid port $126_I$ to move generally along the first region 106 of the chamber 190 in a direction $D_1$. The flow moves through the first region 106 in the direction $D_1$ until the fluid reaches the second opening 116.

The flow then changes direction and moves through the second opening 116 into the second region 108. Within the second region 108, flow moves generally in the direction $D_2$ until reaching the outlet $148_O$.

The divider 102 and blocker flange 122 thus force fluid flow through substantially all areas of the chamber 190, which can facilitate effective cooling or heating of the battery pack 14. The blocker flange 122 and the divider 102 block fluid from moving from the first region 106 to the second region 108 that has not passed through the second opening 116.

The example lid 174 is secured to the heat exchanger tray with mechanical fasteners. Specifically, a group of perimeter mechanical fasteners 156 is disposed about a perimeter of the lid 174. The fasteners 156 are received within corresponding receptacles 158 provided by the tray 164. Other attachment technologies could be used in other examples.

The example lid 174 is additionally secured to the tray 164 with fasteners 162 received within apertures 166 that align with the chamber 190 of the tray 164 when the lid 174 is held against the tray 164. Some of these fasteners are received apertures within posts 172 forming a portion of the divider 102, or spanning the first region 106 or the second region 108 of the chamber 190.

A seal 176 can be positioned about a perimeter of the chamber 190 to block leakage of fluid from the chamber 190. The seal 176 can be a gasket seal, or could be a type of adhesive. Similar seals can be positioned about the apertures within the posts 172. The seals 176 block fluid from leaking through these apertures.

Figure 11:
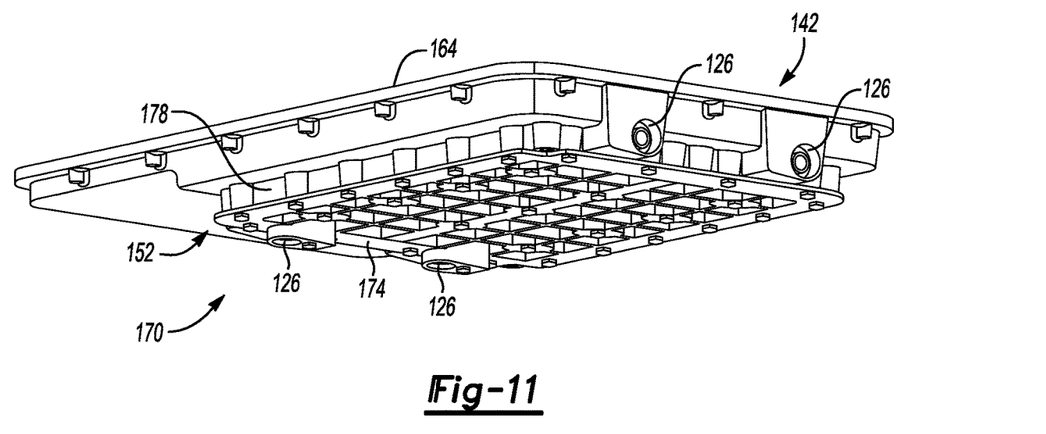
FIG. 11 illustrates a perspective view of the first end of the battery pack heat exchanger of FIG. 3 with the heat exchanger lid held against the wall in a second position.
Figure 12:
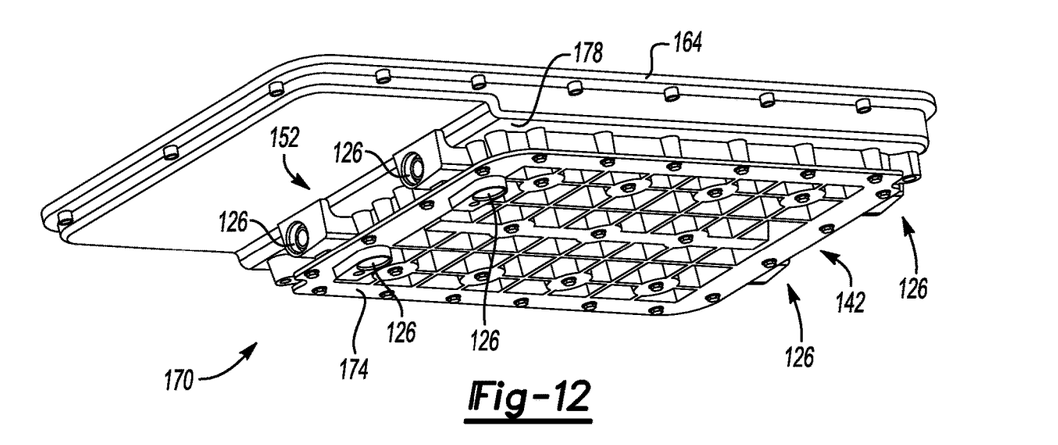
FIG. 12 illustrates a perspective view of the second end of the battery pack heat exchanger of FIG. 3 with the heat exchanger lid held against the wall in the second position.

In FIGS. 5 and 6, the lid 174 is secured to the tray 164 in a first position. Referring to FIGS. 11 and 12, the lid 174 is secured to the tray 164 in a second position. In the second position, the lid 174 is rotated 180° from the first position relative to the tray 164.

When the lid 174 is in the second position, the blocker flange 122 is positioned within the second opening 116. Further, the fluid ports 126 within the tray are positioned near the second end 152 rather than near the first end 142.

Because the lid 174 is securable to the tray 164 in both a first position and a second position, the designer has even more flexibility for the positioning of the inlet conduit I and outlet conduit O.

For example, when one of the fluid ports 126 in the lid 174 is used as the inlet to the chamber 190, the inlet can be positioned near the first end 142 of the chamber 190 or the second end 152 by holding the lid 174 against the tray 164 in the first position of the second position.

Further, positioning the lid 174 in either the first position or the second position enables the blocker flange 122 to block fluid movement through the first opening 112 or the second opening 116 so that the designer may provide a desired path of coolant through the chamber 190.

The designer may, for example, desire to move coolant from the first region 106 to the second region 108 through the first opening 112 rather than the second opening 116.

Thus, the designer can place the lid 174 in the position of FIGS. 11 and 12 to move the blocker flange 122 into the appropriate position.

Features of some of the disclosed examples include placing multiple fluid ports within a tray and a heat exchanger lid, which provides flexibility to the designer for managing thermal energy in a battery pack. An inlet and an outlet to a chamber can be repositioned according to packaging constraints and the designer's desires. Another feature includes incorporating a heat exchanger into a battery pack without requiring a separate heat exchanger plate within an enclosure of the battery pack.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack heat exchanger, comprising:
   a wall of an enclosure, the enclosure providing an open area that receives a battery array; and
   a heat exchanger lid held against the wall to provide a chamber that receives a fluid to exchange thermal energy with the battery array through the wall when the fluid is within the chamber and outside the open area; and
   a cover, wherein the wall of the enclosure is a tray secured to the cover to provide the open area, wherein a plurality of sidewalls of the enclosure extend from the tray, the cover, or both such that the enclosure surrounds the battery assembly on all sides,
   wherein the enclosure encloses the battery array within the open area of the enclosure, wherein the chamber is fluidly isolated from the open area.

2. The battery pack heat exchanger of claim 1, wherein the battery array is supported upon a supporting surface of the wall and the heat exchanger lid is secured an outer surface of the wall, the outer surface opposite the supporting surface.

3. The battery pack heat exchanger of claim 1, further comprising a plurality of fluid ports within the heat exchanger lid or the wall, the plurality of fluid ports providing more than one connection point that connects a fluid inlet conduit to the chamber, more than one connection point that connects a fluid outlet conduit to the chamber, or more than one connection point that connects either the fluid outlet conduit or the fluid inlet conduit to the chamber.

4. The battery pack heat exchanger of claim 3, wherein at least one of the fluid ports in the plurality of fluid ports is within a first end region of the heat exchanger lid, and at least one of the fluid ports in the plurality of fluid ports is within a second end region of the heat exchanger lid, the first end region opposite the second end region.

5. The battery pack heat exchanger of claim 3, wherein at least one of the fluid ports in the plurality of fluid ports is within a first end region of the wall, and at least one of the fluid ports in the plurality of fluid ports is within a second end region of the wall, the first end region opposite the second end region.

6. The battery pack heat exchanger of claim 1, further comprising a divider separating the chamber into at least a first region and a second region.

7. The battery pack heat exchanger of claim 6, wherein the first region is configured to communicate a flow of fluid through the chamber in a first direction, and the second region is configured to communicate a flow of fluid through the chamber in a second direction opposite the first direction.

8. The battery pack heat exchanger of claim 7, further comprising an opening permitting the flow of fluid in the first region of the chamber to move to the second region of the chamber.

9. A battery pack heat exchanger, comprising:
a wall of an enclosure, the enclosure providing an open area that receives a battery array;
a heat exchanger lid held against the wall to provide a chamber that receives a fluid to exchange thermal energy with the battery array through the wall when the fluid is within the chamber and outside the open area;
a divider separating the chamber into at least a first region and a second region, the first region is configured to communicate a flow of fluid through the chamber in a first direction, the second region is configured to communicate a flow of fluid through the chamber in a second direction opposite the first direction; and
an opening permitting the flow of fluid in the first region of the chamber to move to the second region of the chamber,
wherein the heat exchanger lid is securable to the wall in a first position and alternatively securable to the wall in a second position, the opening is closer to a first axial end of the wall when the heat exchanger lid is in the first position than when the heat exchanger lid is in the second position.

10. The battery pack heat exchanger of claim 1, wherein the battery array is disposed upon a first surface of the wall, and an opposite, second side of the wall partially defines an outer perimeter of the chamber.

11. The battery pack heat exchanger of claim 1, wherein the enclosure encloses the battery array on all sides.

* * * * *

UNITED STATES PATENT AND TRADEMARK OFFICE
CERTIFICATE OF CORRECTION

PATENT NO. : 10,224,584 B2
APPLICATION NO. : 14/804703
DATED : March 5, 2019
INVENTOR(S) : Dave Moschet et al.

It is certified that error appears in the above-identified patent and that said Letters Patent is hereby corrected as shown below:

In the Claims

In Claim 2, Column 8, Line 39; replace "is secured an outer surface" with --is secured to an outer surface--

Signed and Sealed this
Twenty-first Day of May, 2019

Andrei Iancu
*Director of the United States Patent and Trademark Office*